(12) United States Patent
Toyota et al.

(10) Patent No.: US 6,498,992 B1
(45) Date of Patent: Dec. 24, 2002

(54) DEFECT DIAGNOSIS METHOD AND DEFECT DIAGNOSIS APPARATUS

(75) Inventors: Toshio Toyota, Fukuoka (JP); Tomoya Niho, Fukuoka (JP); Hou Jinyama, Fukuoka (JP); Hidemichi Komura, Tokyo (JP)

(73) Assignee: Rion Co. Ltd., Tokyo (JP)

( * ) Notice: Subject to any disclaimer, the term of this patent is extended or adjusted under 35 U.S.C. 154(b) by 0 days.

(21) Appl. No.: 09/291,260

(22) Filed: Apr. 13, 1999

(30) Foreign Application Priority Data

Dec. 4, 1998 (JP) .......................... 10-345118

(51) Int. Cl.⁷ ............................... G01B 5/28
(52) U.S. Cl. ..................... 702/35; 73/570; 342/192
(58) Field of Search .................... 702/35, 66, 67, 702/70, 75, 76, 77, 54, 56, 58, 81, 91, 93, 103, 168, FOR 104, FOR 110, FOR 125; 342/192; 73/570

(56) References Cited

U.S. PATENT DOCUMENTS

| | | | | |
|---|---|---|---|---|
| 5,394,155 A | * | 2/1995 | Rubin et al. | 342/192 |
| 5,690,116 A | * | 11/1997 | Goujon | 600/454 |
| 6,170,333 B1 | * | 1/2001 | Jinnai et al. | 73/570 |
| 6,173,236 B1 | * | 1/2001 | Elmore et al. | 702/64 |

* cited by examiner

*Primary Examiner*—Marc S. Hoff
*Assistant Examiner*—Mohamed Charioui
(74) *Attorney, Agent, or Firm*—Merchant & Gould P.C.

(57) ABSTRACT

A method for diagnosis of a defect of an object to be inspected, such as a rotational machine, etc., by measuring a vibration generated thereby, wherein a measured signal generated by the object is detected, an amplitude probability density function of wave-form of the obtained measured signal is expanded orthogonally through a Gram-Charlier series, and the Gram-Charlier series are calculated so as to make diagnosis of defect(s) in the object to be inspected.

8 Claims, 4 Drawing Sheets

Vibration Acceleration Wave-form of Normal Bearing

Gram-Charlier Distribution Function of Normal Bearing

Vibration Acceleration Wave-form of Defective Bearing

Tracking of Difference Function of Defective Bearing

DEFECT DIAGNOSIS METHOD AND DEFECT DIAGNOSIS APPARATUS

BACKGROUND OF THE INVENTION

Field of the Invention

The present invention relates to a defect diagnosis in a friction system, such as bearings and/or gears in a rotational machine, and to a defect diagnosis in a construction system, such as an unbalance in rotating masses and/or a misalignment where two rotational machines run off an axis thereof.

A sudden and/or unexpected stoppage of manufacturing machinery equipment brings about extremely large economic loss. In facilities utilizing the manufacturing equipment, precautionary maintenance is practiced for preventing such trouble such as a sudden unexpected stoppage. As an example of the method of precautionary maintenance for preventing such trouble, a sound or/and a vibration being generated by the machinery equipment in operation is measured so as to determine the condition thereof. Such a procedure is called a "state-base precaution". Here, the conventional arts will be explained in terms of the state-base precaution, by taking a vibration measurement as an example.

When making the diagnosis of the presence of troubles by measuring the vibration of machinery equipment, it is decided whether the measured vibration exceeds a reference value or not in the magnitude thereof. Ordinarily, two kinds of reference values are prepared for the decisions. Namely, if the detected value exceeds the reference value being the smaller of the reference values, it is found to be in a domain of caution, therefore observation must be performed frequently, though the equipment operation will be continued. If the detected value exceeds the reference value being the larger of the reference values, it is found to be in a domain of danger, therefore equipment operation must be stopped in order for the equipment to be restored or repaired immediately. When the state of the machinery equipment reaches to the caution domain, a time when it reaches to the danger domain is predicted from a guide such as a chart or a graph indicating a tendency in the past of changes from a normal state into the caution domain, so as to provide for production planning which has the highest economic efficiency and a planning of maintenance, including the restoration or repair.

The equipment of the manufacturing machines located in a factory or works of a company varies depending upon the purposes thereof, i.e., there are used various kinds or sorts of machinery, being different in revolution speed, electric power consumption (torque), and/or loads, including large or small values thereof, or a machine having a large vibration or one having a small vibration.

Each reference value for deciding the presence of the defect or failure is unique and characteristic to each particular machinery equipment, and the reference values are decided on the basis of a large accumulated number of sample data representative of the defect or failure conditions, as well as those representative of the normal conditions. However, for fully obtaining the effect of the state-base precaution, an appropriate reference value for decision is needed.

A significant investment of labor is needed to determine the above reference for decision, since enough sample data may not be obtainable due to a rareness or scarcity of the troubles or accident, or since the kinds or sorts of the machines to be inspected is too large in number. Further, there are many companies which cannot apply the state-base maintenance, because of such reasons as that there is no engineer for maintenance work who has applied knowledge in trouble or defect diagnosis, therefore the sample data cannot be gathered.

Though the state-base maintenance is an economical and superior method of maintenance with reduced costs or expenses, the most suitable possible decision reference or criterion must be decided upon so as to apply the state-base maintenance, as mentioned previously. Many companies are unable to apply the state-base maintenance, since this reference for decision cannot be appropriately decided thereby.

SUMMARY OF THE INVENTION

According to the present invention, an object is to provide a diagnosis method wherein attention is paid to a difference of a probability density function of amplitude obtained by normalizing a wave-form of a measured signal, such as the wave-form of vibration which is generated by the machine, from a normal distribution, thereby proposing the decision criterion which can be applied in common to the different facilities of many rotational machines, and also to provide a trouble or defect diagnosis apparatus comprising those functions.

The present invention is based upon a principle that the amplitude probability density function of a measured signal, such as the vibration being generated by an object to be detected, for example, a machine, etc., operating under a normal condition, coincides with the normal distribution, however, it is shifted from the normal distribution when trouble or abnormal condition arises in the machine.

According to the present invention, while no component information relating to the measured signal is utilized, such as the amplitude and the vibration number thereof which is generated by the object such as a machine to be inspected, the normalized amplitude probability density function is decided to coincide with the normal distribution or not, fully independent of specifications such as the revolution number, the electric power consumption, the load and the scale of the structure of the machine.

Namely, according to the present invention, there is provided a defect diagnosis method for an object to be inspected, comprising:
  detecting a measured signal being generated by said object to be inspected;
  expanding orthogonally an amplitude probability density function of a wave-form of the obtained measured signal in a Gram-Charlier series; and
  calculating the Gram-Charlier series so as to make a diagnosis of a defect in the object to be inspected.

Here, the defect in the present invention means indicates the condition where the machine operates differently from operation under the normal condition, but not that it is already in an inoperable condition.

Further, according to the present invention, there is provided a defect diagnosis method for an object to be inspected, comprising:
  detecting a measured signal being generated by said object to be inspected;
  expanding orthogonally an amplitude probability density function of a wave-form of the obtained measured signal in a Gram-Charlier series; and Further, according to the present invention, there is provided a defect diagnosis method for an object to be inspected, comprising:

detecting a measured signal being generated by said object to be inspected;

expanding a wave-form of the obtained measured signal obtained in a Fourier series to obtain a frequency spectrum;

expanding orthogonally an amplitude probability density function by viewing the obtained frequency spectrum from an axis of an amplitude thereof in a Gram-Charlier series; and calculating the Gram-Charlier series so as to make diagnosis of a defect in said object to be inspected.

Further, according to the present invention, there is provided a defect diagnosis method for an object to be inspected, comprising:

detecting a measured signal being generated by said object to be inspected;

expanding a wave-form of the obtained measured signal in a Fourier series to obtain a frequency spectrum;

expanding orthogonally an amplitude probability density function by viewing the obtained frequency spectrum from an axis of an amplitude thereof in a Gram-Charlier series; and calculating a difference from a normal distribution so as to make a diagnosis of a defect in the object to be inspected. In the invention defined in the above, the measured signal may be a vibration.

In the invention defined in the above, the measured signal may be an acoustic, an acoustic emission, fluctuations of current or of effective electric power rather than a vibration.

In the invention defined in the above, the object to be inspected can include a vehicle, an aircraft and a construction other than an ordinary machine.

Furthermore, according to the present invention, there is provided a defect diagnosis apparatus for implementing the defect diagnosis method, comprising a probe with respect to the object to be inspected.

Here, a method with use of an expanding equation of the Gram-Charlier series will be explained in detail below.

The amplitude probability density function of the normal distribution $N(\mu, \sigma^2)$ can be expressed as follows, assuming that an averaged value is $\mu$ and a dispersion is $\sigma^2$.

$$f(x) = \frac{1}{\sigma\sqrt{2\pi}} e^{-\frac{(x-\mu)^2}{2\sigma^2}}$$

Here, by making the averaged value $\mu=0$ and the dispersion $\sigma^2=1$, the normalized $N(0,1)$ can be expressed as follows:

$$f(x) = \frac{1}{\sqrt{2\pi}} e^{-\frac{x^2}{2}}$$

where, $\phi(x)$ is as follows.

$$\varphi(x) = e^{-\frac{x^2}{2}}$$

It is presumed that an arbitrary density function $p(x)$ can be expanded in the following form with use of a normal distribution density function $\phi(x)$ and a derived function thereof:

$$p(x) = c_0 \varphi^{(0)}(x) + \frac{c_1}{1!}\varphi^{(1)}(x) + \frac{c_2}{2!}\varphi^{(2)}(x) + \frac{c_3}{3!}\varphi^{(3)}(x) + \frac{c_4}{4!}\varphi^{(4)}(x) + \ldots \quad (1)$$

where the $\phi^{(n)}(x)$ is expressed by a polynomial of Hermite as below.

$$\phi^{(n)}(x) = (-1)^n H_n(x)\phi(x) \quad (2)$$

And the equation (1) is derived as follows.

$$p(x) = c_0 H_0(x)\varphi(x) - \frac{c_1}{1!} H_1(x)\varphi(x) + \frac{c_2}{2!} H_2(x)\varphi(x) - \quad (3)$$
$$\frac{c_3}{3!} H_3(x)\varphi(x) + \frac{c_4}{4!} H_4(x)\varphi(x) - \ldots + \frac{c_n}{n!} H_n(x)\varphi(x) - \ldots$$

Then, by differentiating the normal distribution density function $\phi(x)$, the following $\phi^{(n)}(x)$ is obtained:

$$\phi^{(1)}(x) = -xe^{-x^2/2} = -x \cdot \phi(x)$$

$$\phi^{(2)}(x) = -\phi(x) - x \cdot \phi^{(1)}(x) = -\phi(x) + x^2 \cdot \phi(x) = (x^2 - 1) \cdot \phi(x)$$

$$\phi^{(3)}(x) = 2x \cdot \phi(x) + (x^2 - 1) \cdot \phi^{(1)}(x) = 2x \cdot \phi(x) - (x^2 - 1) \cdot x \cdot \phi(x) = -(x^3 - 3x) \cdot \phi(x)$$

$$\phi^{(4)}(x) = (-3x^2 + 3) \cdot \phi(x) - (x^3 - 3x) \cdot \phi^{(1)}(x) = (-3x^2 + 3) \cdot \phi(x) + (x^3 - 3x) \cdot x \cdot \phi(x) = (x^4 - 6x^2 + 3) \cdot \phi(x)$$

$$\phi^{(5)}(x) = (4x^3 - 12x) \cdot \phi(x) + (x^4 - 6x^2 + 3) \cdot \phi^{(1)}(x) = (4x^3 - 12x) \cdot \phi(x) - (x^4 - 6x^2 + 3) \cdot x \cdot \phi(x) = -(x^5 - 10x^3 + 15x) \cdot \phi(x)$$

$$\phi^{(6)}(x) = (-5x^4 + 30x^2 - 15) \cdot \phi(x) -$$

$$(x^5 - 10x^3 + 15x) \cdot \phi^{(1)}(x) =$$

$$(-5x^4 + 30x^2 - 15) \cdot \phi(x) +$$

$$(x^5 - 10x^3 15x) \cdot x \cdot \phi(x) =$$

$$(x^6 - 15x^4 + 45x^2 - 15) \cdot \phi(x)$$

From those differentiating values and the above equation (2), the following can be obtained:

$$H_0(x) = 1$$

$$H_1(x) = x$$

$$H_2(x) = x^2 - 1$$

$$H_3(x) = x^3 - 3x$$

$$H_4(x) = x^4 - 6x^2 + 3$$

$$H_5(x) = x^5 - 10x^3 + 15x$$

$$H_6(x) = x^6 - 15x^4 + 45x^2 - 15$$

Further, the polynomial of Hermite has an orthogonality as below:

$$\int_{-\infty}^{\infty} H_m(x) H_n(x) \varphi(x) = \delta_{mn}(x) = m! \quad (m = n)$$
$$= 0 \quad (m \neq n)$$

An integration is executed by multiplying $H_n(x)$ at the both sides of the equation (3):

$$\int_{-\infty}^{\infty} H_n(x)p(x)dx = c_0 \int_{-\infty}^{\infty} H_n(x)H_0(x)\varphi(x) - \frac{c_1}{1!}\int_{-\infty}^{\infty} H_n(x)H_1(x)\varphi(x) +$$

-continued $$\frac{c_2}{2!}\int_{-\infty}^{\infty}H_n(x)H_2(x)\varphi(x) - \frac{c_3}{3!}\int_{-\infty}^{\infty}H_n(x)H_3(x)\varphi(x) +$$

$$\frac{c_4}{4!}\int_{-\infty}^{\infty}H_n(x)H_4(x)\varphi(x) - \ldots + \frac{c_n}{n!}\int_{-\infty}^{\infty}H_n(x)H_n(x)\varphi(x) - \ldots$$

Since the Hermite polynomial has the orthogonality, only the clauses having the same order, and derived is the following:

$$(-1)^n\int_{-\infty}^{\infty}H_n(x)p(x)dx = c_n \quad (4)$$

$$c_0 = \int_{-\infty}^{\infty}p(x)dx$$

$$c_1 = -\int_{-\infty}^{\infty}x\cdot p(x)dx$$

$$c_2 = \int_{-\infty}^{\infty}(x^2-1)p(x)dx = \int_{-\infty}^{\infty}x^2p(x)dx - \int_{-\infty}^{\infty}p(x)dx$$

$$c_3 = -\int_{-\infty}^{\infty}(x^3-3x)p(x)dx = -\int_{-\infty}^{\infty}x^3p(x)dx + 3\int_{-\infty}^{\infty}x\cdot p(x)dx$$

$$c_4 = \int_{-\infty}^{\infty}(x^4-6x^2+3)p(x)dx = \int_{-\infty}^{\infty}x^4p(x)dx - 6\int_{-\infty}^{\infty}x^2p(x)dx + 3\int_{-\infty}^{\infty}p(x)dx$$

$$c_5 = -\int_{-\infty}^{\infty}(x^5-10x^3+15x)p(x)dx = -\int_{-\infty}^{\infty}x^5p(x)dx + 10\int_{-\infty}^{\infty}x^3p(x)dx - 15\int_{-\infty}^{\infty}x\cdot p(x)dx$$

$$c_6 = \int_{-\infty}^{\infty}(x^6-15x^4+45x^2-15)p(x)dx$$

$$= \int_{-\infty}^{\infty}x^6p(x)dx - 15\int_{-\infty}^{\infty}x^4p(x)dx + 45\int_{-\infty}^{\infty}x^2p(x)dx - 15\int_{-\infty}^{\infty}p(x)dx$$

Here, it is assumed that n number of time series data $\lambda_i$ are collected from the vibration data which the machine generates.

Then, the average value $\mu$ is obtained as follows, and the total data is shifted by the average value ($\lambda_i = \lambda_i - \mu$).

$$\mu = \frac{\sum_{i=1}^{n}\lambda_i}{n}$$

Next, an effective value $\sigma$ is obtained as is expressed below, so as to normalize the total data ($\lambda_i = \lambda_i/\sigma$).

$$\sigma = \sqrt{\frac{\sum_{i=1}^{n}\lambda_i^2}{n}}$$

The following summations are obtained from the time series data which are normalized:

$$s_0 = n, \; s_1 = \sum_{i=1}^{n}\lambda_i, \; s_2 = \sum_{i=1}^{n}\lambda_i^2, \; s_3 = \sum_{i=1}^{n}\lambda_i^3,$$

-continued $$s_4 = \sum_{i=1}^{n}\lambda_i^4, \; s_5 = \sum_{i=1}^{n}\lambda_i^5, \; s_6 = \sum_{i=1}^{n}\lambda_i^6, \ldots$$

Then, those summations are divided by the number of the data as follows:

$$s_0 = n/n = 1, \; s_1 = \frac{\sum_{i=1}^{n}\lambda_i}{n} = 0, \; s_2 = \frac{\sum_{i=1}^{n}\lambda_i^2}{n} = 1, \; s_3 = \frac{\sum_{i=1}^{n}\lambda_i^3}{n}$$

$$s_4 = \frac{\sum_{i=1}^{n}\lambda_i^4}{n}, \; s_5 = \frac{\sum_{i=1}^{n}\lambda_i^5}{n}, \; s_6 = \frac{\sum_{i=1}^{n}\lambda_i^6}{n}, \ldots$$

By inserting them into those coefficient $c_j$, then the following is obtained:

$c_0 = s_0 = 1$ $c_1 = -s_1 = 0$ $c_2 = s_2 - s_0 = 0$ $c_3 = -s_3 + 3s_1 = -s_3$ $c_4 = s_4 - 6s_2 + 3s_0 = s_4 - 3$ $c_5 = -s_5 + 10s_3 - 15s_1 = -s_5 + 10s_3$ $c_6 = s_6 - 15s_4 + 45s_2 - 15s_0 = s_6 - 15s_4 + 30$

By the normalization as in the above, $c_0 = 1$ and $c_1 = c_2 = 0$, therefore a compensated clause starts with the third clause.

The coefficient $c_j$ can be expressed as below.

$c_3 = -s_3$ $c_4 = s_4 - 3$ $c_5 = -s_5 + 10s_3$ $c_6 = s_6 - 15s_4 + 30$

The series being obtained by the expansion in this manner is called the Gram-Charlier series. The Gram-Charlier series contain therein elements of the defect or trouble and deterioration. However, mathematically, as the Gram-Charlier series are in orthogonal relationships with each other, the elements of the defects and deterioration contained therein can be considered to be totally independent of each other.

When the amplitude probability density function is the normal distribution, all of the Gram-Charlier series become zero. When the condition comes into the defect or trouble and shifts from the normal distribution, each absolute value of these numeral (series) values becomes large. Accordingly, by determining the criterion or reference value of the Gram-Charlier series, it is possible to make diagnosis of the defects or troubles.

From the equation (3), the arbitrary density function $p(x)$ becomes as follows:

$$p(x) = \left(1 + \frac{c_3}{3!}(x^3 - 3x) + \frac{c_4}{4!}(x^4 - 6x^2 + 3) + \frac{c_5}{5!}(x^5 - 10x^3 + 15x) + \frac{c_6}{6!}(x^6 - 15x^4 + 45x^2 - 15) + \ldots\right)\varphi(x) \quad (5)$$

This is called a Gram-Charlier distribution function. This Gram-Charlier distribution function is the function which is the most analogous or approximated to the amplitude probability density function which is actually measured.

The arbitrary density function can be expressed by a sum of the normal distribution density function $\phi(x)$ and a differentiation function r(x), as shown in the following equation:

$$p(x)=\phi(x)+r(x)$$

where the difference function r(x) becomes as below from the equation (5):

$$r(x) = p(x) - \varphi(x) = \qquad (6)$$
$$\left(\frac{c_3}{3!}(x^3 - 3x) + \frac{c_4}{4!}(x^4 - 6x^2 + 3) + \frac{c_5}{5!}(x^5 - 10x^3 + 15x) + \frac{c_6}{6!}(x^6 - 15x^4 + 45x^2 - 15) + \dots \right)\varphi(x)$$

Then, the next equation is defined:

$$\delta = \int_{-6}^{6} (r(x))^2 dx \qquad (7)$$

where a square integration value of the difference function r(x) from 6 to −6 is the difference $\delta$.

The difference $\delta$ is zero when the amplitude probability density function is coincident with the normal distribution, while the numeral value comes to be large when being in the condition of the defect or trouble and shifted from the normal distribution. Accordingly, by determining the criterion or the reference value of the difference $\delta$, it is possible to make the diagnosis of the defect or trouble.

DESCRIPTION OF THE PREFERRED EMBODIMENTS

Hereinafter, detailed explanation of the embodiments according to the present invention will be given by referring to attached drawings.

Figure 1:
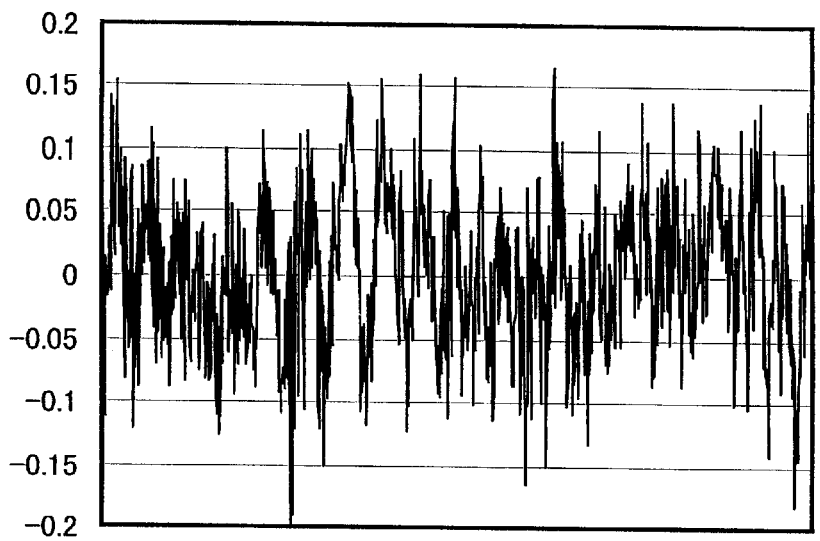
FIG. 1 shows an example of normal data for explaining a principle in the operation of the present invention, in particular, the wave-form of a vibration acceleration generated from a bearing under a normal condition.

FIG. 1 shows a wave-form of a vibration acceleration under the normal condition of a bearing. The Gram-Charlier series of this wave-form are obtained.

Obtaining the summation value of $s_3$–$s_6$ after being shifted by a direct current component of the wave-form and normalized with effective values, the $s_3$–$s_6$ are as follow;

$s_3$=−0.02568, $s_4$=2.9750, $s_5$=−0.74344 and $s_6$=15.065 and the obtained Gram-Charlier series of this wave-form are the following:

$c_3$=0.02568, $c_4$=−0.02497, $c_5$=1.0002 and $c_6$=0.43950

The reference values or criteria for decision are determined as L=4 and H=10 from a large number of data which are stored or accumulated, and a method for decision is as follows:

(1) normal when $\frac{c_3^2}{3!} < L$, and $\frac{c_4^2}{4!} < L$, and $\frac{c_5^2}{5!} < L$, and $\frac{c_6^2}{6!} < L$ (2) danger when $\frac{c_3^2}{3!} > H$, or $\frac{c_4^2}{4!} > H$, or $\frac{c_5^2}{5!} > H$, or $\frac{c_6^2}{6!} > H$ (3) caution when it is not any one of them.

From the Gram-Charlier series obtained here, operation is decided to be normal.

Figure 2:
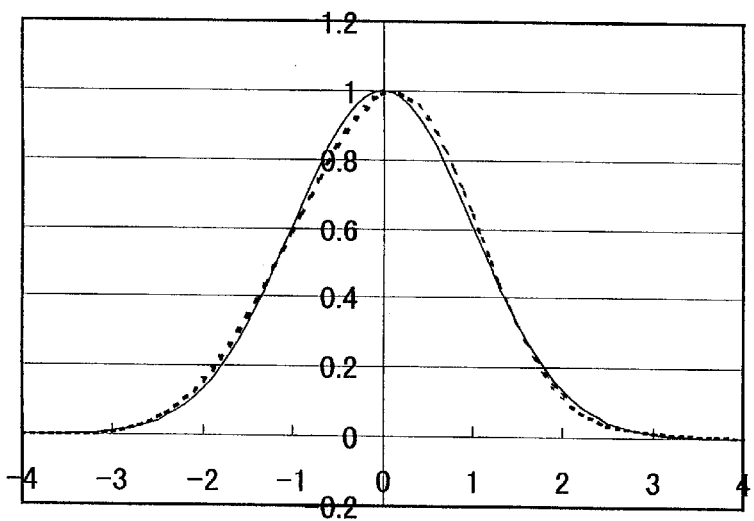
FIG. 2 shows a curve of tracking of a Gram-Charlier distribution function which is obtained upon the basis of the vibration acceleration wave-form data generated from the bearing under the normal condition and a normal distribution for comparison.

Putting the obtained Gram-Charlier series up to the sixth ($6^{th}$) order into the equation (5), the Gram-Charlier distribution function is obtained and a track following it is shown in FIG. 2. A curve of a broken line in FIG. 2 shows the Gram-Charlier distribution function, while a solid shows the normal distribution. The difference $\delta$ calculated from the equation (7) has an extremely small value, such as 0.003, therefore it is possible to determine that operation is normal.

Figure 3:
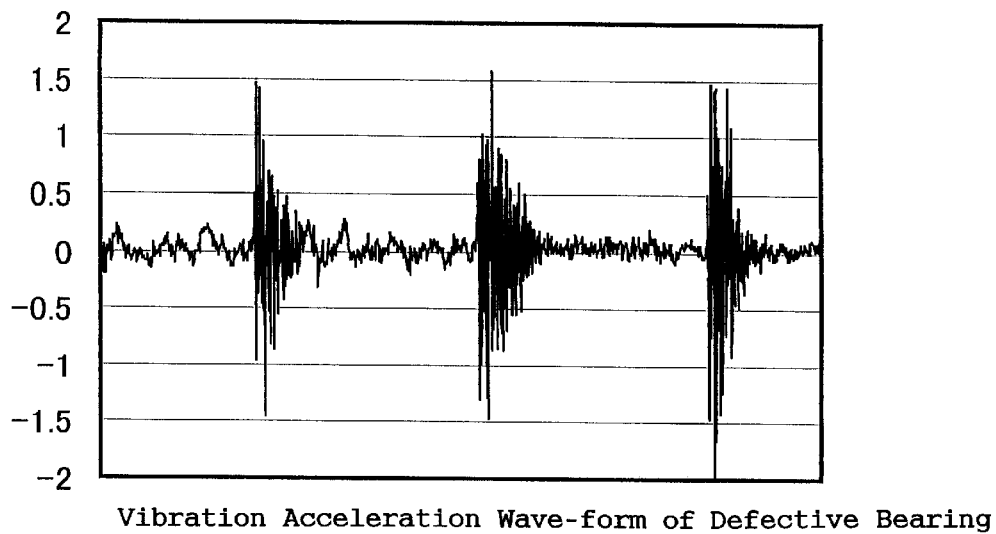
FIG. 3 shows an example of abnormal or defect data for explaining the principle in the operation of the present invention, in particular, the wave-form of a vibration acceleration generated from a bearing having a defect or trouble therein.

Next, it is tried or applied to a bearing having a defect therein, with use of the vibration acceleration data thereof. FIG. 3 shows the wave-form of the vibration acceleration of the bearing having a defect therein.

Obtaining the summation value of $s_3$–$s_6$ after being shifting by a direct current component of the wave-form and normalized with effective values, the $s_3$–$s_6$ are as follows;

$s_3$=−0.77954, $s_4$=20.609, $s_5$=−68.010 and $s_6$=911.94 and the obtained Gram-Charlier series of this wave-form are the following:

$c_3$=0.77954, $c_4$=17.609, $c_5$=75.806 and $c_6$=632.80

Based on those Gram-Charlier series obtained with the method mentioned previously, the condition is decided to be dangerous.

Figure 4:
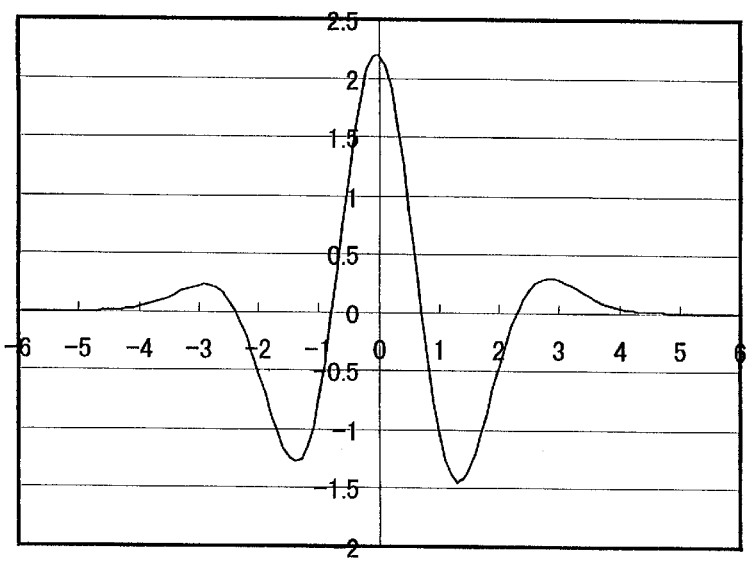
FIG. 4 shows a tracking curve of the difference function which is obtained upon the basis of the vibration acceleration wave-form data generated from a bearing that can be decided to be defected or broken.

The difference function r(x), which is obtained by putting only the third ($3^{rd}$) and the fourth ($4^{th}$) of the Gram-Charlier series into the equation (6), is as follows:

$$r(x) = \left(\frac{0.77954}{3!}(x^3 - 3x) + \frac{17.609}{4!}(x^4 + 6x^2 + 3)\right)\varphi(x)$$

and then, this difference function follows the track as shown in FIG. 4.

Here, calculating it on the basis of the equation (7), the difference $\delta$ is 6.32. If the reference value or criterion for decision is 2.5, then it is decided to be in the danger region or domain.

Next, detailed descriptions will be given with reference to concrete examples.

(1) A First Example: Diagnostic apparatus for defect of friction type:

This apparatus makes diagnosis of a defect or trouble relating to friction, such as abnormality in bearings, abnormality in gears, abnormality on belts or leakage, etc.

Figure 5:
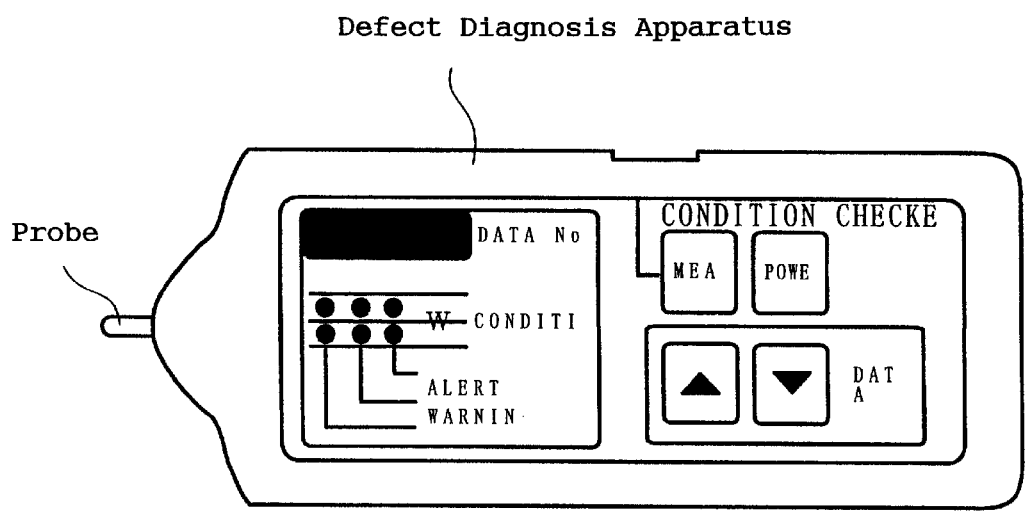
FIG. 5 shows the construction of a defect diagnosis apparatus according to the present invention.
Figure 6:
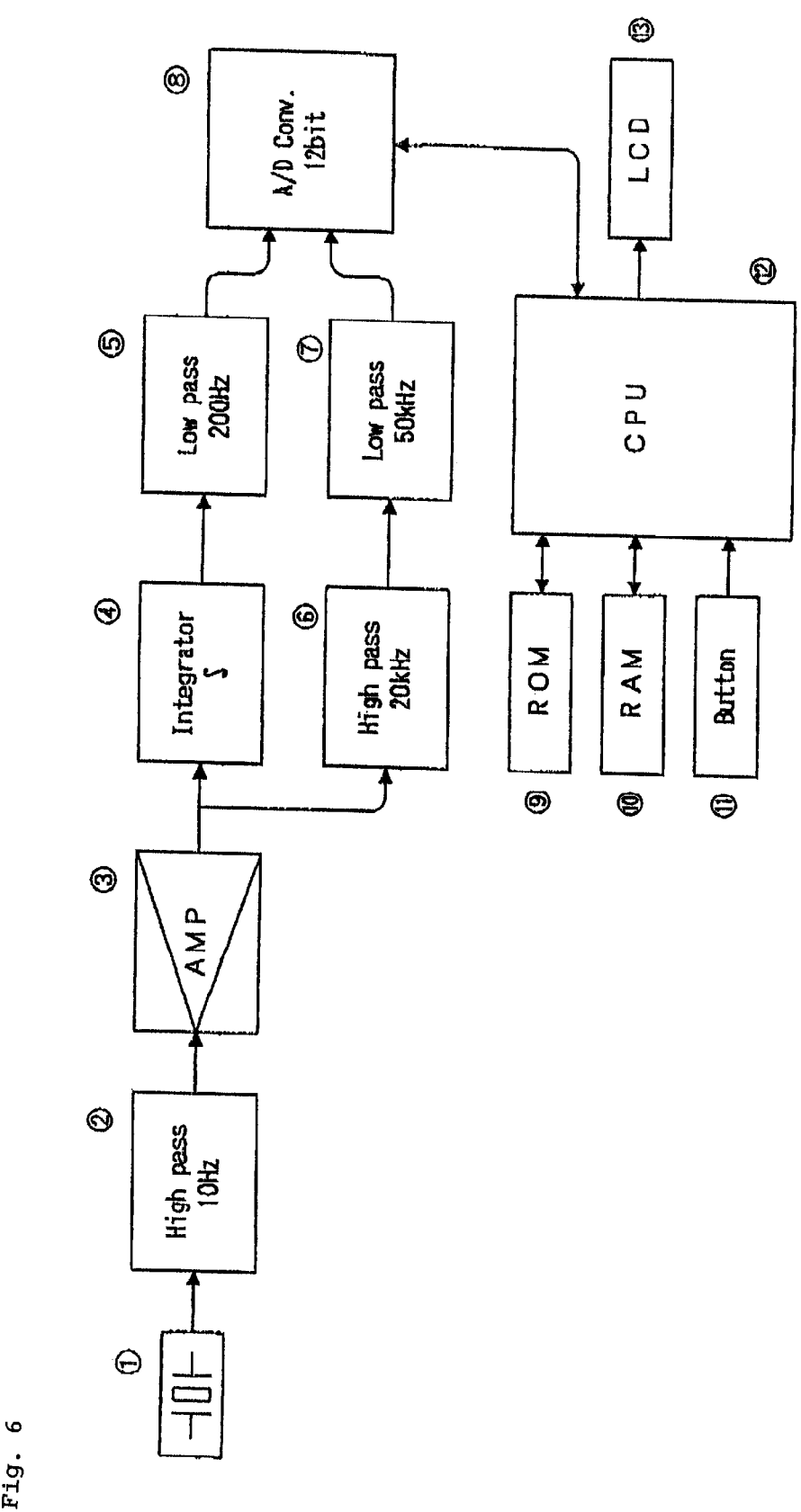
FIG. 6 shows a block diagram of the defect diagnosis apparatus according to the present invention.

The construction of a defect diagnostic apparatus is shown in FIG. 5. A vibration sensor thereof is of a pressure-electric type, and the vibration acceleration of 20 kHz to 50 kHz is measured thereby.

A microcomputer performs the following calculation processing and input/output processing of data. The results of the diagnosis are displayed on a liquid crystal display (LCD) as "normal", "caution" or "danger".

(1) Sample data $x_i$ at number 4096 is memorized every 250 μsec, and at the same time the following summation is executed:

$$s_1 = \sum_{i=1}^{4096} x_i$$

(2) The average value $\mu$ is obtained, i.e., $\mu = s_1/4096$, then $x_i$ is shifted by the average value $\mu$ so as to delete the DC component therefrom.

$$x_i = x_i - \mu$$

(3) The effective value σ is obtained as below:

$$s_2 = \sum_{i=1}^{4096} x_i^2,$$

the effective value:

$$\sigma = \sqrt{\frac{s_2}{4096}} = x_{rms}$$

and the $x_i$ is normalized as below.

$$x_i = \frac{x_i}{\sigma}$$

(4) The summation values of $s_3$ through $s_6$ are obtained as follows:

$$s_3 = \sum_{i=1}^{4096} x_i^3 \quad s_4 = \sum_{i=1}^{4096} (x_i^2)^2 \quad s_6 = \sum_{i=1}^{4096} (x_i^3)^2$$

and then averaged as below:

$$S_3 = s_3/n \quad S_4 = s_4/n \quad S_6 = s_6/n$$

Next, abnormal coefficients are obtained by an expansion equation of Gram-Charlier, as below:

$$c_3 = S_3$$

$$c_4 = S_4 - 3$$

$$c_6 = S_6 - 15 S_4 + 30$$

(6) The conditions for the diagnosis of defect or trouble is as below:

a) normal: when $\frac{c_3^2}{3!} < L$, and $\frac{c_4^2}{4!} < L$, and $\frac{c_6^2}{6!} < L$ b) danger: when $\frac{c_3^2}{3!} > H$, or $\frac{c_4^2}{4!} > H$, or $\frac{c_6^2}{6!} > H$ c) caution: when the condition a) or b) is not satisfied, and L=4 and H=10.

(2) A Second Example:
Diagnostic apparatus for defect of construction:
This makes a diagnosis of a defect or trouble in construction, such as unbalance, decentering or eccentricity, misalignment, axial bending, relaxation or looseness, cracks, rattling or clattering, etc.

The construction of an apparatus is the same as in the first example, and the vibration acceleration is measured within a frequency range from 10 kHz to 200 kHz.

(1) Time series data Xi at number 512 are memorized every 2 msec.

(2) The Fourier transformation is treated on the time series data $X_n$ with weighting by means of Hunning window, and 200 power spectra $f_i$ are obtained.

(3) The average value $\mu$ is obtained with respect to 191 power spectra by every 1 Hz from 10 Hz to 200 Hz, as below:

$$s_1 = \sum_{i=10}^{200} f_i,$$

the average value: $\mu = s_1/191$ and then, the power spectra $f_i$ are shifted by the average value $\mu$ as below: $f_i' = f_i - \mu$ (4) Then, the effective value σ is obtained as follows:

$$s_2 = \sum_{i=10}^{200} (f_i')^2$$

the effective value:

$$\sigma = \sqrt{\frac{s_2}{191}}$$

and the power spectra $f_i'$ is normalized as below:

$$f_i'' = \frac{f_i'}{\sigma}$$

(5) Considering $f_i''$ is a wave-form, the summations of $s_3$ through $s_6$ are obtained from the spectrum data of number 191 as follows:

$$s_3 = \sum_{i=10}^{200} f_i^3 \quad s_4 = \sum_{i=10}^{200} (f_i^2)^2 \quad s_6 = \sum_{i=10}^{200} (f_i^3)^2$$

and then they are averaged as below:

$$S_3 = s_3/n \quad S_4 = s_4/n \quad S_6 = s_6/n$$

(6) Next, abnormal coefficients are obtained by an expansion equation of Gram-Charlier, as below:

$$c_3 = S_3$$

$$c_4 = S_4 - 3$$

$$c_6 = S_6 - 15 S_4 + 30$$

(6) The conditions for the diagnosis of defect or trouble is as below:

a) normal: when $\frac{c_3^2}{3!} < L$, and $\frac{c_4^2}{4!} < L$, and $\frac{c_6^2}{6!} < L$ -continued b) danger: when $\frac{c_3^2}{3!} > H$, or $\frac{c_4^2}{4!} > H$, or $\frac{c_6^2}{6!} > H$ c) caution: when the condition a) or b) is not satisfied, and L=4 and H=10.

(3) Other Example:

In the first and the second examples mentioned above, explanation of the present invention is applied to defect diagnosis apparatus operating on the basis of vibration measurement, however the present invention should not be restricted only to them. It can also applied to defect diagnosis apparatus operating on the basis of the measured signal of an acoustic, an acoustic emission, a fluctuation of current, a fluctuation of effective electric power, etc.

As is fully mentioned in the above, according to the present invention, by measuring a measured signal, such as the vibration which is generated by the object to be detected, including a machine, and by determining only one reference value or criterion for decision with respect to the value so that the normalized probability density function of amplitude shifts from the normal distribution, it is possible to achieve the defect diagnosis apparatus which can diagnose a defect or trouble of the object to be detected, including a large variety of rotational machines which are different in the specifications thereof.

What is claimed is:

1. A method for diagnosis of a defect of an object to be inspected, comprising:

detecting a measured signal being generated by said object to be inspected;

expanding orthogonally an amplitude probability density function of a wave-form of the obtained measured signal in a Gram-Charlier series; and calculating the Gram-Charlier series so as to make diagnosis of the defect in the object to be inspected.

2. A method for diagnosis of a defect as defined in claim 1, wherein said measured signal is a vibration.

3. A method for diagnosis of a defect as defined in claim 1, wherein said measured signal is an acoustic, an acoustic emission, a fluctuation of current or a fluctuation of effective electric power.

4. A method for diagnosis of a defect as defined in claim 1, wherein said object to be inspected is any one of a machine, a vehicle, an aircraft and a building.

5. A defect diagnosis apparatus for implementing the method for diagnosis as defined in claim 1, comprising a probe which is made to touch the object to be inspected.

6. A method for diagnosis of a defect of an object to be inspected, comprising:

detecting a measured signal being generated by said object to be inspected;

expanding orthogonally an amplitude probability density function of a wave-form of the obtained measured signal in a Gram-Charlier series; and calculating a difference from a normal distribution so as to make diagnosis of the defect in the object to be inspected.

7. A method for diagnosis of a defect of an object to be inspected, comprising:

detecting a measured signal being generated by said object to be inspected;

expanding a wave-form of the obtained measured signal in a Fourier series to obtain a frequency spectrum;

expanding orthogonally an amplitude probability density function by viewing the obtained frequency spectrum from an axis of an amplitude thereof in a Gram-Charlier series; and calculating the Gram-Charlier series so as to make diagnosis of the defect in the object to be inspected.

8. A method for diagnosis of a defect of an object to be inspected, comprising:

detecting a measured signal being generated by said object to be inspected;

expanding a wave-form of the obtained measured signal in a Fourier series to obtain a frequency spectrum;

expanding orthogonally an amplitude probability density function by viewing the obtained frequency spectrum from an axis of an amplitude thereof in a Gram-Charlier series; and calculating a difference from a normal distribution so as to make diagnosis of the defect in the object to be inspected.

* * * * *